United States Patent
Yang (10) Patent No.: US 8,937,648 B2
(45) Date of Patent: Jan. 20, 2015

(54) RECEIVING SYSTEM AND METHOD OF PROVIDING 3D IMAGE

(75) Inventor: Jin Mo Yang, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 12/788,393

(22) Filed: May 27, 2010

(65) Prior Publication Data

US 2010/0321479 A1 Dec. 23, 2010

Related U.S. Application Data (60) Provisional application No. 61/219,400, filed on Jun. 23, 2009.

(51) Int. Cl.
*H04N 13/04* (2006.01)
*H04N 9/47* (2006.01)
*H04N 13/00* (2006.01)
*H04N 21/4363* (2011.01)
*H04N 21/81* (2011.01)

(52) U.S. Cl.
CPC ....... *H04N 13/0051* (2013.01); *H04N 13/0055* (2013.01); *H04N 13/0066* (2013.01); *H04N 13/0497* (2013.01); *H04N 21/43635* (2013.01); *H04N 21/816* (2013.01)
USPC ............ 348/51; 348/52; 348/54; 348/56; 348/58; 348/60

(58) Field of Classification Search
CPC .......... H04N 13/0497; H04N 13/0434; H04N 13/0431
USPC ..................................... 348/51–60
See application file for complete search history.

(56) References Cited

U.S. PATENT DOCUMENTS

| | | | |
|---|---|---|---|
| 5,880,729 | A | 3/1999 | Johnston, Jr. et al. |
| 6,157,383 | A | 12/2000 | Loop |
| 6,621,509 | B1 | 9/2003 | Eiref et al. |
| 7,441,201 | B1 * | 10/2008 | Printezis ............... 715/762 |
| 7,685,619 | B1 | 3/2010 | Herz |
| 2004/0070673 | A1 | 4/2004 | Nakamura |
| 2004/0100479 | A1 | 5/2004 | Nakano et al. |
| 2006/0139448 | A1 | 6/2006 | Ha et al. |
| 2006/0192776 | A1 | 8/2006 | Nomura et al. |
| 2006/0253802 | A1 | 11/2006 | Kim |

(Continued)

FOREIGN PATENT DOCUMENTS

| | | |
|---|---|---|
| CN | 1497923 A | 5/2004 |
| CN | 1882106 A | 12/2006 |

(Continued)

OTHER PUBLICATIONS

European Search Report for Application PCT/KR2010/003451 dated Dec. 28, 2010.

(Continued)

*Primary Examiner* — Chikaodili E Anyikire
(74) *Attorney, Agent, or Firm* — Ked & Associates, LLP (57) ABSTRACT

A three-dimensional (3D) image may be provided in a receiving system by receiving a request for a 3D image viewing while displaying content from a first input source, switching from the first input source to a second input source that correspond to a specific source device, receiving the 3D image transmitted from the specific source device, and displaying the received 3D image at the receiving system.

10 Claims, 7 Drawing Sheets

(56) References Cited

U.S. PATENT DOCUMENTS

| | | | |
|---|---|---|---|
| 2007/0003134 A1 | 1/2007 | Song et al. | |
| 2007/0121182 A1 | 5/2007 | Fukushima | |
| 2007/0165027 A1 | 7/2007 | Nakadaira et al. | |
| 2007/0274672 A1 | 11/2007 | Itoi | |
| 2007/0300184 A1* | 12/2007 | Song | 715/810 |
| 2008/0252604 A1 | 10/2008 | Huang et al. | |
| 2008/0309755 A1 | 12/2008 | Yoshida et al. | |
| 2009/0002368 A1* | 1/2009 | Vitikainen et al. | 345/422 |
| 2009/0116818 A1 | 5/2009 | Sasaki et al. | |
| 2009/0141172 A1 | 6/2009 | Liu | |
| 2009/0141180 A1 | 6/2009 | Kondo et al. | |
| 2009/0153737 A1* | 6/2009 | Glen | 348/571 |
| 2009/0263007 A1* | 10/2009 | Kitaura et al. | 382/154 |
| 2010/0026790 A1* | 2/2010 | Ohba et al. | 348/51 |
| 2010/0039428 A1 | 2/2010 | Kim et al. | |
| 2010/0074594 A1* | 3/2010 | Nakamura et al. | 386/92 |
| 2010/0118120 A1 | 5/2010 | Takahashi et al. | |
| 2010/0225645 A1 | 9/2010 | Suh et al. | |
| 2012/0162367 A1 | 6/2012 | Ha | |
| 2012/0182402 A1 | 7/2012 | Hwangbo et al. | |

FOREIGN PATENT DOCUMENTS

| | | |
|---|---|---|
| CN | 101448109 A | 6/2009 |
| EP | 1 187 495 | 3/2002 |
| JP | 2002-095014 | 3/2002 |
| JP | 2005-065162 | 3/2005 |
| JP | 2005-110121 | 4/2005 |
| KR | 10-2007-0052260 | 5/2007 |
| KR | 10-2008-0028366 | 3/2008 |
| KR | 10-2009-0004181 | 1/2009 |
| TW | 2009 20121 A | 5/2009 |
| WO | WO 01/31585 | 5/2001 |
| WO | WO 2008/001264 | 1/2008 |
| WO | WO 2008/013131 | 1/2008 |
| WO | WO 2008/033961 A2 | 3/2008 |
| WO | WO 2009/077927 A1 | 6/2009 |
| WO | WO 2009/077929 A1 | 6/2009 |

OTHER PUBLICATIONS

European Search Report for Application PCT/KR2010/003452 dated Dec. 29, 2010.
European Search Report for Application PCT/KR2010/003009 dated Dec. 29, 2010.
D.D.R.J. Bolio, "Integration of 3D Video into the Blu-ray format," Master Thesis, Dept. of Mathematics and Computer Science, Technische universiteitEindhoven, Eindhove, Oct. 2007.
Office Action for U.S. Appl. No. 12/792,386 dated Jul. 31, 2012.
Office Action dated Dec. 5, 2012 for U.S. Appl. No. 12/792,386.
Chinese Office Action for Application 201080028300.0 dated Apr. 30, 2014 and English language translation.
Office Action dated Sep. 12, 2013 for co-pending U.S. Appl. No. 12/791,319.
Chinese Office Action dated Mar. 5, 2014 issued in Application No. 201080046352.0 (with English translation).
U.S. Appl. No. 12/791,319 dated Apr. 8, 2013.
U.S. Office Action for U.S. Appl. No. 12/792,386 dated Mar. 21, 2013.
Chinese Office Action for Application No. 201080035859.6 dated May 9, 2014 and English language translation.
Extended European Search Report for Application 10792258.5 dated Jul. 11, 2013.
HDMI: "High-Definition Multimedia Interface, Specification Version 1.4," Internet citation, Jun. 5, 2009, 425 pages XP009133650, retrieved from the internet: URL: http://wenku.baidu.com/view/e7db77d184254b35eefd34d0.html.
Bobo D D R J: Integration of 3D video into the Blu-ray format, Master Thesis Technische Universiteit Eindhoven Deparatment of Mathematics and Computer Science, TEchnische Universiteit, Eindhove, NL, Oct. 31, 2007, pp. I-IX, I, XP008148221, retrieved from the Internet: URL: http://alexandria.tu.nl/extra1/afstvers1/wsk-i/bolio2007.pdf.
U.S. Office Action dated Jun 19, 2014 for co-pending U.S. Appl. No. 12/791,319.
Extended European Search Report for Application 10797238.2 dated Dec. 20, 2013.
Korean Notice of Allowance for Application 10-2012-7005784 dated Dec. 20, 2013.
U.S. Notice of Allowance for U.S. Appl. No. 12/792,386 dated Jan. 6, 2014.
U.S. Office Action for U.S. Appl. No. 12/791,319 dated Jan. 27, 2014.
"3D Active Button Magic" XP007922454 MultiMedia Soft Jan. 1, 2002 pp. 1-12.

* cited by examiner

| Byte \ Bit # | 7 | 6 | 5 | 5 | 3 | 2 | 1 | 0 |
|---|---|---|---|---|---|---|---|---|
| HB 0 | Packet Type = 0x81 ||||||||
| HB 1 | Version = 0x01 ||||||||
| HB 2 | 0 | 0 | 0 | Length = Nv |||||

FIG. 3

| Packet Byte # | 7 | 6 | 5 | 5 | 3 | 2 | 1 | 0 |
|---|---|---|---|---|---|---|---|---|
| PB 0 | Checksum ||||||||
| PB 1 | 24bit IEEE Registration Identifier (0x000C03) (least significant byte first) ||||||||
| PB 2 | ||||||||
| PB 3 | ||||||||
| PB 4 | HDMI_Video_Format | Rsvd (0) | Rsvd (0) | Rsvd (0) | Rsvd (0) | Rsvd (0) |||
| PB 5 | HDMI_VIC ||||||||
|  | 3D_Structure | Reserved(0) |||||||
| PB (Nv) | Reserved(0) ||||||||

FIG. 4

| Value [2...0] | Description |
| --- | --- |
| 000 | No additional HDMI video format is presented in this packet |
| 001 | Extended resolution format (e.g. used for 4K x 2K video) present 1byte of HDMI_VIC parameter value follows |
| 010 | 3D format indication present 3d_structure follows |
| 011 ~ 111 | Reserved for future use |

FIG. 5

| Value | Meaning |
| --- | --- |
| 0000 | Frame packing |
| 0001 | Field alternative |
| 0010 | Line alternative |
| 0011 | Side-by-Side(Full) |
| 0100 | L + depth |
| 0101 | L + depth + graphics + graphics-depth |
| 0110 ~ 0111 | Reserved for future use |
| 1000 | Side-by-Side (Half) |
| 1001 ~ 1111 | Reserved for future use |

FIG. 6

| Operation id | User Operation |
|---|---|
| 0x00 | Select |
| 0x01 | Up |
| 0x02 | Down |
| 0x03 | Left |
| 0x04 | Right |
| 0x05 | Right-Up |
| 0x06 | Right-Down |
| 0x07 | Left-Up |
| 0x08 | Left-Down |
| 0x09 | Root Menu |
| 0x0A | Setup Menu |
| 0x0B | contents Menu |
| 0x0C | Favorite Menu |
| 0x0D | Exit |
| 0x0E - 0x0F | Reserved |
| 0x10 | media Top Menu |
| 0x11 | media Context-sensitive Menu |
| 0x12-0x1C | Reserved |
| 0x1D | Number Entry Mode |
| 0x1E | Number 11 |
| 0x1F | Number 12 |
| 0x20 | Number 0 or Number 10 |
| 0x21 - 0x29 | Number 1 - 9 |
| 0x2A | Dot |
| 0x2B | Entrer |
| 0x2C | Clear |
| 0x2D - 0x2E | Reserved |
| 0x2F | Next Favorite |

| Operation id | User Operation |
|---|---|
| 0x30 | Channel Up |
| 0x31 | Channel Down |
| 0x32 | Previous Channel |
| 0x33 | Sound Select |
| 0x34 | Input Select |
| 0x35 | Display Information |
| 0x36 | Help |
| 0x37 | Page Up |
| 0x38 | Page Down |
| 0x39 - 0x3F | Reserved |
| 0x40 | Power |
| 0x41 | Volume Up |
| 0x42 | Volume Down |
| 0x43 | Mute |
| 0x44 | Play |
| 0x45 | Stop |
| 0x46 | Pause |
| 0x47 | Record |
| 0x48 | Rewind |
| 0x49 | Fast forward |
| 0x4A | Eject |
| 0x4B | Forward |
| 0x4C | Backward |
| 0x4D | Stop-Record |
| 0x4E | Pause-Record |
| 0x4F | Reserved |
| 0x50 | Angle |
| 0x51 | Sub picture |

| Operation id | User Operation |
|---|---|
| 0x52 | Video on Demand |
| 0x53 | Electronic Program Guide |
| 0x54 | Timer Programming |
| 0x55 | Initial Configuration |
| 0x56 | Select Broadcast Type |
| 0x57 | Select Sound Presentation |
| 0x58 - 0x5F | Reserved |
| 0x60 | Play Function |
| 0x61 | Pause-Play Function |
| 0x62 | Record Function |
| 0x63 | Pause-Record Function |
| 0x64 | Stop Function |
| 0x65 | Mute Function |
| 0x66 | Restore Volume Function |
| 0x67 | Tune Function |
| 0x68 | Select Media Function |
| 0x69 | Select A/V Input Function |
| 0x6A | Select Audio Input Function |
| 0x6B | Power Toggle Function |
| 0x6C | Power Off Function |
| 0x6D | Power On Function |
| 0x6E - 0X70 | Reserved |
| 0x71 | F1 (Blue) |
| 0x72 | F2 (Red) |
| 0x73 | F3 (Green) |
| 0x74 | F4 (Yellow) |
| 0x75 | F5 |
| 0x76 | Data |
| 0x77 - 0xFF | Reserved |

RECEIVING SYSTEM AND METHOD OF PROVIDING 3D IMAGE

This application claims priority and benefit from U.S. Provisional Application No. 61/219,400, filed Jun. 23, 2009, the subject matter of which is hereby incorporated by reference.

BACKGROUND

1. Field

Embodiments of the present invention may relate to an apparatus and method for processing an image signal, and more particularly to a receiving system for receiving a three-dimensional (3D) image signal and displaying a 3D image.

2. Background 3 dimensional (3D) images (or stereographic images) may depend on principles of stereo eyesight of two eyes. A binocular parallax according to an interval between two eyes spaced apart from each other at about 65 mm may be a factor that allows a person to feel a three-dimensional effect. If plane images associated with each other are viewed respectively by two eyes, a brain may combine these different images together to provide an original depth and reality of the 3D image.

The 3D image may be displayed in accordance with any one of a stereoscopic method, a volumetric method, and/or a holographic method.

BRIEF DESCRIPTION OF THE DRAWINGS

Arrangements and embodiments may be described in detail with reference to the following drawings in which like reference numerals refer to like elements and wherein:

FIG. 6 is a table illustrating examples of a control command that can be provided through a CEC line;

DETAILED DESCRIPTION

Reference may now be made in detail to preferred embodiments of the present invention, examples of which may be illustrated in the accompanying drawings. Wherever possible, same reference numbers may be used throughout the drawings to refer to the same or similar parts. Arrangements and embodiments shown in the accompanying drawings and described by the drawings are only exemplary, and technical spirits of the present invention and its main operation are not limited by such embodiments.

Embodiments of the present invention may search for a source device that provides a 3D image, receive the 3D image from the searched source device, and process and display the received 3D image when a user desires to view the 3D image. If a plurality of source devices that provide a 3D image are provided, embodiments may receive and display the 3D image from a source device selected by the user after providing the user with information of the source devices. According to another example embodiment, when a plurality of source devices may provide a 3D image, embodiments may receive 3D images from the plurality of source devices and display the received 3D images at a constant time interval.

Examples of the 3D image may include a stereo (or stereoscopic) image that considers two view points and a multi-view image that considers three or more view points.

The stereo image may be a pair of left and right images acquired by taking a single subject using a left camera and a right camera that are laterally spaced apart from each other at a constant distance. The multi-view image may be three or more images acquired by taking a single subject using three or more cameras having a constant distance or angle.

Examples of a display type that displays a 3D image may include a display type with glasses and a display type without glasses.

The display type with glasses may be divided into a passive display type and an active display type. The passive display type may respectively display a left image and a right image using a polarized filter. The passive display type may mean that a user respectively wears a blue glass and a red glass on both eyes to view images. The active display type may split a left image and a right image from each other by covering a left eye and a right eye in due order. The active display type may mean that a time-split screen may be periodically repeated and a user may view the images by wearing glasses with an electronic shutter synchronized with the repeated period. The active display type may be referred to as a time split type or a shuttered glass type.

Examples of the display type without glasses may include a lenticular display type and a parallax barrier display type. In the lenticular display type, a lenticular lens plate provided with a cylindrical lens array vertically arranged may be arranged at a front of an image panel. The parallax barrier display type may be provided with a barrier layer having periodical slits on an image panel.

The 3D image may be directly provided to the receiving system through a broadcasting station, or may be provided from the source device to the receiving system. Devices that can provide a 3D image may be used as the source device. Examples of the devices may include a personal computer (PC), a camcorder, a digital camera, a digital video disc (DVD) device (for example, DVD player, DVD recorder, etc.), a set top box, and/or a digital TV. A display device that receives a 3D image from a source device may be referred to as a receiving system. Devices having a display function, such as a digital TV and a monitor, may be used as the receiving system. The receiving system may be referred to as a sink device.

According to one example embodiment, the source device and the receiving system may transmit and receive a 3D image signal and a control signal using a digital interface.

Examples of the digital interface may include a digital visual interface (DVI) and a high definition multimedia interface (HDMI). According to one example embodiment, the HDMI may be used as the digital interface. The source device and the receiving system may be coupled to each other through an HDMI cable.

Figure 1:
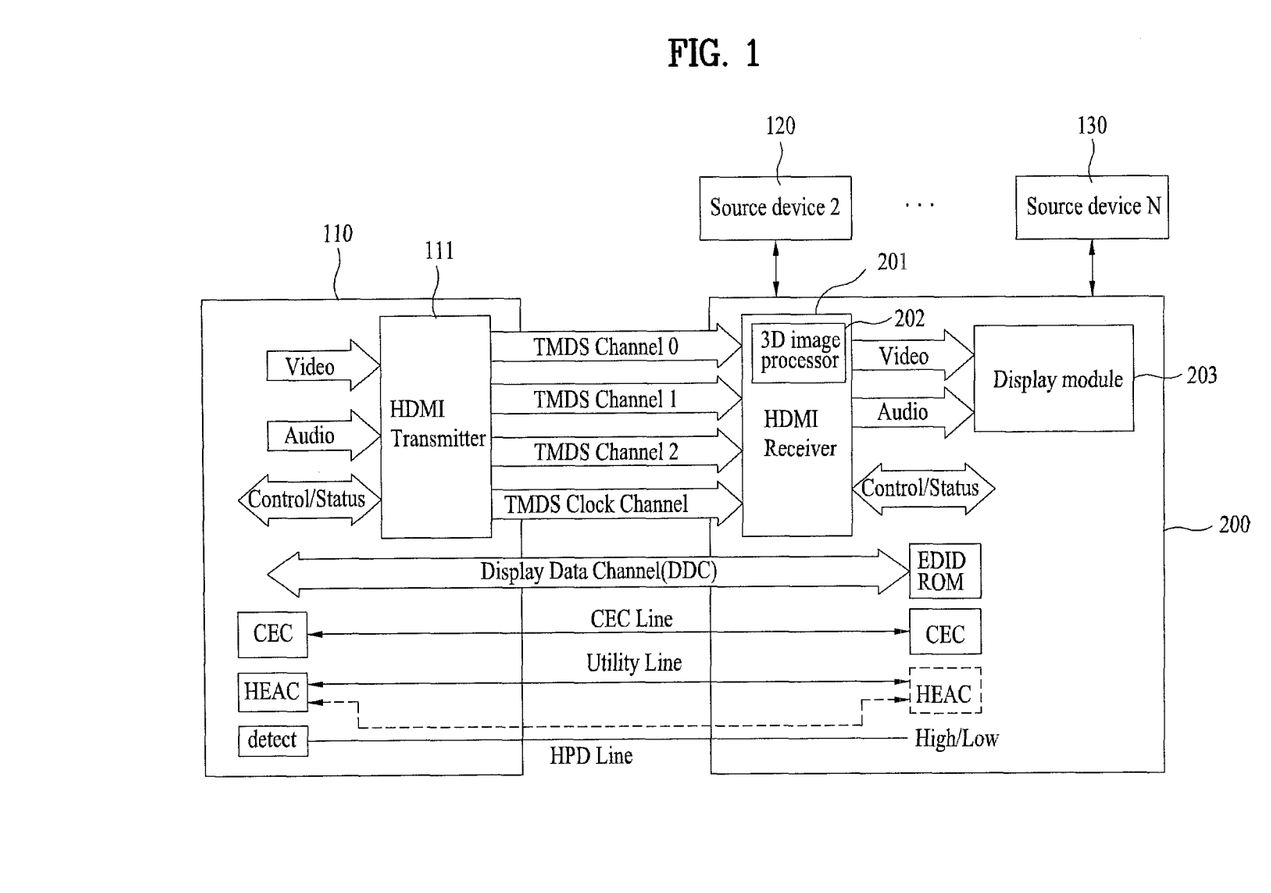
FIG. 1 is a diagram illustrating a plurality of source devices coupled to a receiving system.

FIG. 1 is a diagram illustrating a plurality of source devices coupled to a receiving system. FIG. 1 shows each of three source devices 110, 120 and 130 coupled to a receiving system 200 through a respective HDMI cable. The receiving system 200 may include at least three HDMI ports, although other numbers or ports may also be provided. Alternatively, no source device may be coupled to the receiving system 200, only one source device may be coupled to the receiving system 200, and/or source devices other than three may be coupled to the receiving system 200.

Each of the three source devices 110, 120, 130 may include an HDMI transmitter. The receiving system 200 may include an HDMI receiver 201. The three source devices 110, 120, 130 may provide a 2D image or a 3D image to the receiving system 200.

The first source device 110 may now be described. The following description may be applied to other source devices.

If the source device is a set top box, the set top box may receive a 3D image from a broadcasting station and provide the 3D image to the receiving system 200. If the source device is a DVD player, the DVD player may provide the 3D image to the receiving system 200 by reading the 3D image from a disc.

In FIG. 1, HDMI may support a high-bandwidth digital content protection (HDCP) standard for preventing contents from being illegally copied, an extended display identification data (EDID) standard, a display data channel (DDC) standard to read the EDID, a consumer electronics control (CEC), and/or a HDMI Ethernet and audio return channel (HEAC). The DDC may forward EDID stored in an EDID ROM of the receiving system 200 to the source device 110. The source device 110 may search various kinds of information such as manufacturer ID, product ID, and/or serial number by identifying the EDID transmitted from the receiving system 200. The source device 110 may identify an audio or video format supported by the receiving system 200 and transmit A/V signals (for example, 3D image signal) suitable for the audio or video format.

The HDMI may use a transition minimized differential signaling interface (TDMS). In an HDMI transmitter 111 of the source device 110, 8 bits of digital video/audio data may be converted to a transition-minimized DC value of 10 bits and may be transmitted to the HDMI receiver 201 of the receiving system 200 by being serialized. The HDMI receiver 201 of the receiving system 200 may deserialize the received digital A/V data and then convert the same to 8 bits. The HDMI cable may need three TDMS channels to transmit digital A/V data. One TMDS link may be provided by a combination of the three TDMS channels and a TMDS clock channel.

The HDMI transmitter 111 may perform A/V data synchronization between the source device 110 and the receiving system 200 through the TMDS clock channel. The HDMI transmitter 111 may transmit a 2D image signal to an HDMI receiver 201 of the receiving system 200 through the three TDMS channels, or may transmit a 3D image signal thereto. The HDMI transmitter 111 may transmit InfoFrames of ancillary data to the HDMI receiver 201 through the three TDMS channels.

In HDMI, CEC may be used. A CEC protocol may provide high-level control functions between all of the various audio-visual products in a user's environment. For example, the CEC may be used for an automatic setup task or a test related to a remote controller (remocon). The HDMI may support Ethernet and an audio return channel. The HEAC may provide Ethernet compatible data networking between connected devices and an audio return channel in an opposite direction from the TDMS.

The HDMI may transmit the 3D image from the source device 110 to the receiving system 200, and may support a 3D image format and resolution so as to process and display the 3D image received from the receiving system 200.

According to one example embodiment, the HDMI receiver 201 of the receiving system 200 may include a 3D image processor 202. The 3D image processor 202 may be provided inside the HDMI receiver 201 as shown in FIG. 1, or may be provided outside the HDMI receiver 201. The 3D image processor 202 may include a microprocessor (micom), and/or may be implemented by hardware or software.

The 3D image processor 202 may search for a source device that can provide a 3D image when a user requests '3D image viewing'. The 3D image processor 202 may process the 3D image received from the searched source device and display the processed 3D image through a display module 203 (or display). The display module 203 may correspond to a screen.

The user may request '3D image viewing' through either an input device (such as a remote controller, a keyboard or a mouse) or a menu screen.

If the user requests '3D image viewing' through the input device, a key for '3D image viewing' may have been previously allocated to the input device. If the key for '3D image viewing' of the input device is input, the 3D image processor 202 may search for source devices that may provide a 3D image.

If a '3D image viewing' icon is displayed on the screen in a menu type, the user may select the '3D image viewing' icon by using a directional key of the input device or by touching the screen on which the '3D image viewing' icon is displayed. Even if '3D image viewing' is requested through the menu screen, the 3D image processor 202 may search source devices that provide a 3D image. Various methods of requesting '3D image viewing' may be provided, and embodiments may not be limited to the above examples. The user may request '3D image viewing' at any time while watching a TV or other external device.

If the user requests '3D image viewing' using one of the above described methods, the 3D image processor 202 may search for source devices that may provide a 3D image.

According to one example embodiment, the receiving system 200 may identify the HDMI port to identify existence of a signal. The existence of a signal may mean that the source device is coupled to the corresponding HDMI port. If the existence of a signal is identified, the receiving system 200 may transmit a play command to the corresponding source device, and may identify or determine whether the corresponding source device may provide a 3D image using a Vendor Specific InfoFrame packet included in the signal transmitted from the source device in accordance with the play command. When it is identified or determined that the source device may provide a 3D image, the receiving system 200 may transmit a play stop command to the source device to stop play of the source device. This process may be repeated for the other HDMI ports. If a single source device that provides a 3D image is provided, the receiving system 200 may switch an input mode to the HDMI port coupled with the source device and may transmit the play command to the source device to play the source device. The receiving system may process the 3D image played and received from the source device and then display the processed 3D image. According to one example embodiment, the receiving system 200 may transmit the play command and the play stop command to the corresponding source device through a CEC line to play the corresponding source device or to stop play of the source device. If the source device is a set top box that receives a 3D image from a broadcasting station and provides the 3D image to the receiving system, the transmitting of the play command and the play stop command may be skipped.

The input mode may be only switched to the HDMI port coupled with the source device.

The Vendor Specific InfoFrame packet may include a header field and a content field.

Figure 2:
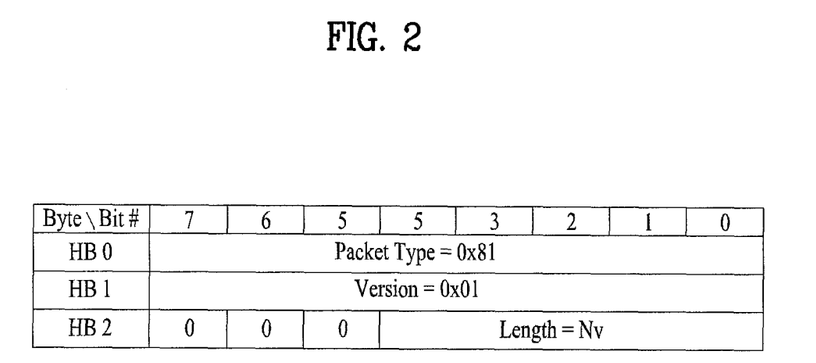
FIG. 2 is a diagram illustrating a header structure of a Vendor Specific InfoFrame packet.

FIG. 2 is a diagram illustrating a header structure of a Vendor Specific InfoFrame packet. As shown in FIG. 2, the header structure may be comprised of 3 bytes. The first byte HB0 may represent a packet type, the second byte HB1 may represent version information, and the lower 5 bits of the third byte HB2 may represent a contents length of the Vendor Specific InfoFrame packet.

According to one example embodiment, the first byte HB0 within a header of the Vendor Specific InfoFrame packet may be represented by a packet type value of 0x81.

Figure 3:
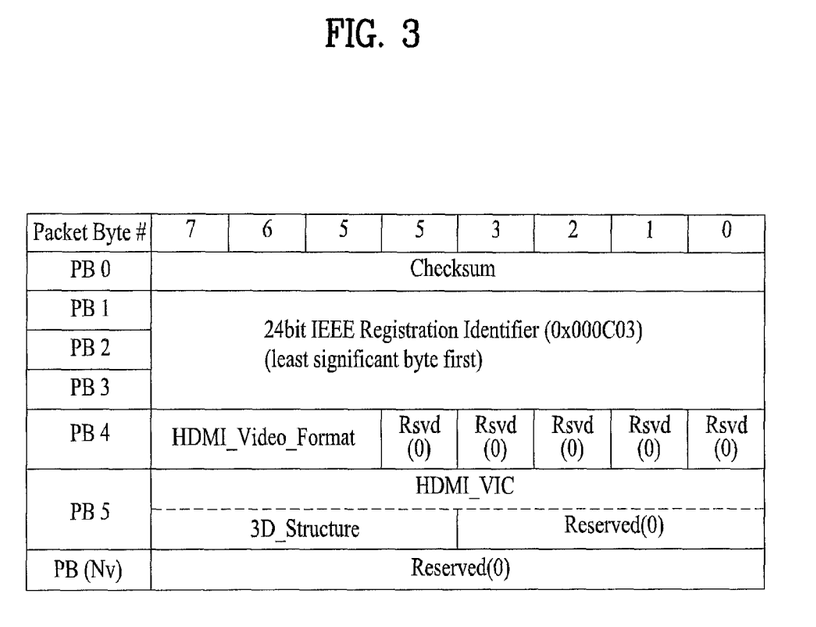
FIG. 3 is a diagram illustrating a content structure of a Vendor Specific InfoFrame packet.

FIG. 3 is a diagram illustrating a content structure of a Vendor Specific InfoFrame packet.

As shown in FIG. 3, an HDMI_Video_Format field may be allocated to a higher 3 bits of a fifth byte PB4 of the Vendor Specific InfoFrame packet content. An identification may be provided of whether the corresponding source device provides a 3D image by using the HDMI_Video_Format value. The HDMI_Video_Format field may define a structure of an extended video format exclusively defined in the HDMI specification.

Figure 4:
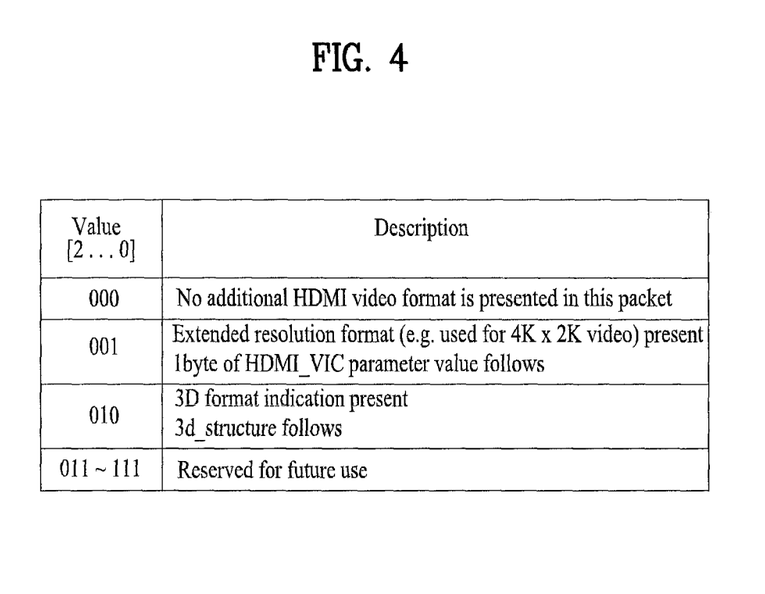
FIG. 4 is a table illustrating a definition of a value allocated to a HDMI_Video_Format field.

FIG. 4 is a table illustrating a definition of a value allocated to a HDMI_Video_Format field. For example, if the HDMI_Video_Format field has a value of 000, it indicates that additional HDMI video format is not provided in this packet. If the HDMI_Video_Format field has a value of 001, it indicates that an extended resolution format is present and an HDMI_VIC field of 1 byte follows. If the HDMI_Video_Format field has a value of 010, it indicates that 3D format indication (3D formation indication) is present and a 3D structure (3D_Structure) field follows.

In other words, if the HDMI_Video_Format field has a value of 010, a higher 4 bit value of the sixth byte PB5 of the corresponding Vendor Specific InfoFrame packet content corresponds to the 3D_Structure field.

The 3D_Structure field may define a transport format of the corresponding 3D image.

Figure 5:
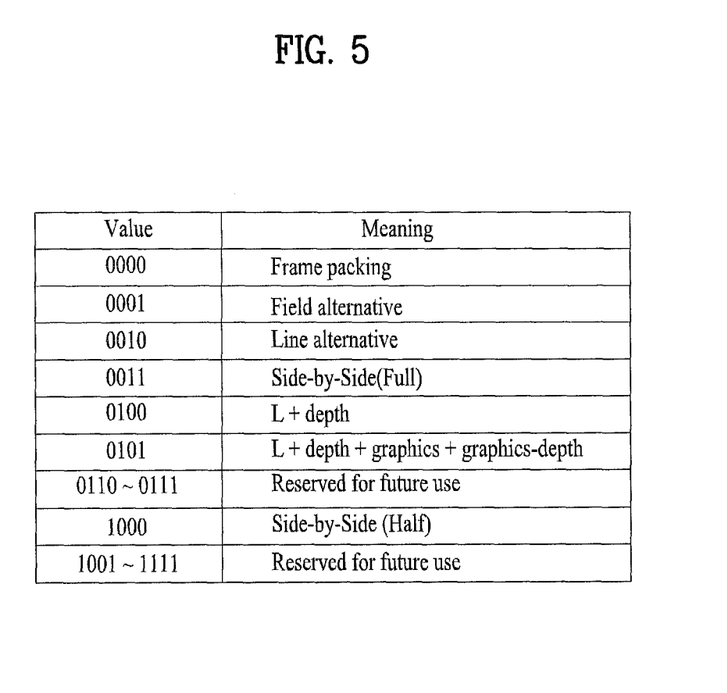
FIG. 5 is a table illustrating a definition of a value allocated to a 3D_Structure field.

FIG. 5 is a table illustrating a definition of a value allocated to a 3D_Structure field. For example, if the HDMI_Video_Format field has a value of 0000, it may indicate that the corresponding 3D image indicates a frame packet format. If the HDMI_Video_Format field has a value of 0001, it may indicate that the corresponding 3D image is a field alternative format. If the HDMI_Video_Format field has a value of 0010, it may indicate that the corresponding 3D image is a line alternative format. If the HDMI_Video_Format field has a value of 0011, it may indicate that the corresponding 3D image is a side by side (full) format. If the HDMI_Video_Format field has a value of 0100, it may indicate that the corresponding 3D image is an L+depth format. If the HDMI_Video_Format field has a value of 0101, it may indicate that the corresponding 3D image is an L+depth+graphics+graphics-depth format. If the HDMI_Video_Format field has a value of 1000, it may indicate that the corresponding 3D image is a side by side (half) format. The side by side format may mean that one stereo image is made by ½ sub-sampling a left image and a right image in a horizontal direction and by locating the sampled left image at the left side and the sampled right image at the right side. The frame packing format may be referred to as a top/bottom format, and may mean that one stereo image is made by ½ sub-sampling a left image and a right image in a vertical direction and by locating the sampled left image at the upper part and the sampled right image at the lower part. The L+depth format may mean that one of the left image and the right image and depth information for making the other one are transmitted together.

If the HDMI_Video_Format field within the received Vendor Specific InfoFrame packet content has a value of 010, it may be identified that the corresponding source device provides an image of a 3D format. The transport format of the corresponding 3D image may be identified using the 3D_Structure field value.

If a single source device that can provide a 3D image is provided, the 3D image processor 202 may switch the input mode (or input source) to the corresponding source device. Subsequently, the 3D image processor 202 may transmit the play command to the source device and then display a 3D image. For example, if the source device is a DVD player, the DVD player may read out the 3D image stored in the disc in accordance with the play command and transmit the 3D image to the receiving system 200. The 3D image processor 202 of the receiving system 200 may decode the received 3D image in a format according to the corresponding 3D_Structure field value and then output the decoded 3D image for display.

The play command may be transmitted to the corresponding source device through the CEC line, whereby the corresponding source device may be played.

FIG. 6 is a table illustrating examples of a control command that can be provided through a CEC line. The play command may be 0×60, for example. After the value of 0×60 is set to the CEC packet, if the value is transmitted to the corresponding source device through the CEC line, the source device that receives the value of 0×60 through the CEC line may perform a play operation.

If the user requests '3D image viewing', it may be identified or determined that the corresponding source device can provide a 3D image based on the HDMI_Video_Format field value of the Vendor Specific InfoFrame packet contents provided from each source device. If it is identified or determined that a single source device that provides a 3D image, the 3D image processor 202 may switch the input mode (or input source) to the corresponding source device and transmit the play command to the corresponding source device using the CEC line. If the corresponding source device is played by the play command, the 3D image processor 202 may decode the 3D image in a transport format of the corresponding source device acquired from the 3D_Structure field and then display the decoded 3D image by receiving the played 3D image from the corresponding source device.

If a plurality of source devices that provide a 3D image are provided, the 3D image processor may report information of the plurality of source devices to a user so that the user may select one of the plurality of source devices. If a plurality of source devices that provide a 3D image are provided, an OSD processor may be further provided for displaying information of the plurality of source devices and allow a user to select one of the plurality of source devices through an OSD. If the user selects one of the source devices, the OSD processor may switch the input mode (or input source) to the selected source device and transmit the play command to the corresponding source device using the CEC line. If the corresponding source device is played by the play command, the OSD processor may receive the 3D image played and transmitted from the corresponding source device, decode the 3D image in the transport format of the corresponding source device acquired from the 3D_Structure field, and display the decoded 3D image. If one source device is not selected by the user, the 3D image viewing may end. If one of the plurality of source devices is a source device previously set in default, the OSD processor may automatically switch the input mode to the source device set in default and transmit the play command. The 3D image played from the source device set in default may be displayed.

If a plurality of source devices that provide a 3D image are provided, the 3D image processor may input the play command to the corresponding source device while switching the input mode to the plurality of source devices at a constant time interval. The 3D image processor may decode the 3D images received in due order from the plurality of source devices in the transport format acquired from the 3D_Structure field of the corresponding source device and then display the decoded 3D image. The period of transmitting the play command by switching to the input mode of each source device, and display the 3D image received by play may be previously set. For example, assuming that the source devices 1, 3 and 4 provide the 3D image, the 3D image played from the source device 1 may be displayed for 30 seconds, the 3D image played from the source device 2 may be displayed for 30 seconds, and the 3D image played from the source device 4 may be displayed for 30 seconds. This process may be repeated or may be performed only once. If one of the source devices is selected by the user, the 3D image played from the selected source device may be continuously displayed.

If the user requests '3D image viewing', the 3D image processor 202 may search a source device that can provide a 3D image from among source devices connected to the HDMI port of the receiving system, and directly play the 3D image from the corresponding source device by automatically switching the input mode to the corresponding source device. The user may directly view the 3D image through a key of an input device such as a remote controller without any separate manipulation.

Figure 7:
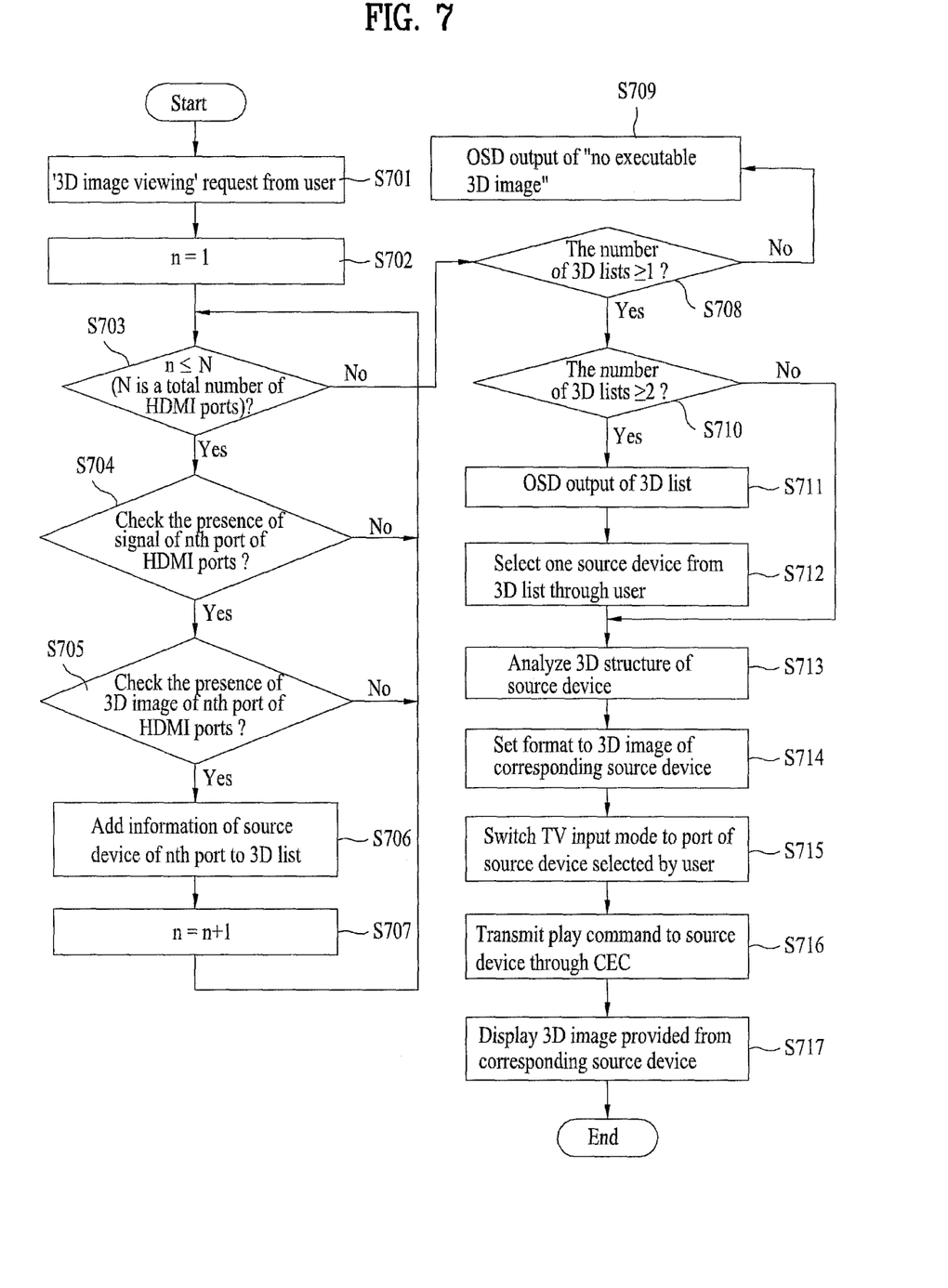
FIG. 7 is a flow chart illustrating a method of playing (or providing) a 3D image.

FIG. 7 is a flow chart illustrating an example of a method of playing (or providing) a 3D image. Other operations and orders of operation may also be provided.

If the user requests '3D image viewing' using an input device, a menu screen, etc. (S701), a parameter n may be set to 1 (S702). It may be identified or determined whether n is smaller than or equal to N (S703). N may be a total number of the HDMI ports provided in the receiving system.

In operation S703, if n is greater than N (i.e., a No result), the current operation may advance to operation S708. If n is smaller than or equal to N (i.e., a Yes result), it may be identified or determined whether there is a signal in the nth HDMI port (S704).

If it is identified or determined that there is a signal, an HDMI_Video_Format field value within a Vendor Specific InfoFrame packet content included in the signal may be parsed to identify or determine whether the source device connected to the nth HDMI port can provide a 3D image (S705). For example, if the HDMI_Video_Format field value is 010, it may be identified or determined that the source device connected to the nth HDMI port can provide a 3D image.

In operation S705, if it is identified or determined that the source device connected to the nth HDMI port can not provide a 3D image (i.e., a Yes result), then the current operation advances to operation 5703.

In operation S705, if it is identified or determined that the source device connected to the nth HDMI port can provide a 3D image (i.e., a Yes result), information of the source device connected to the nth HDMI port may be added to a 3D list (S706), and n may increase to 1 (S703) and then the current operation advances to operation S703 (S707).

If n becomes greater than N through the above operations, it may be identified or determined whether the number of source devices stored (recorded) in the 3D list is less than 1 in operation S708.

If the number of source devices stored (recorded) in the 3D list is less than 1 (i.e., a No result), it may mean that there is no source device connected to the HDMI port of the receiving system, or there is a source device connected to the HDMI port but there is no source device that can provide a 3D image. An error message may be displayed through OSD processing (S709). For example, an error message such as 'no executable 3D image' may be displayed.

In operation S708, if the number of source devices stored (recorded) in the 3D list is greater than 1 (i.e., a Yes result), it may mean that at least one source device is connected to the receiving system and at a same time there is at least one source device that can provide a 3D image.

If it is identified or determined in operation S708 that the number of source devices stored (recorded) in the 3D list is greater than 1, it may be again identified or determined whether the number of source devices stored (recorded) in the 3D list is greater than or equal to 2 (S710). In operation S710, if the number of source devices stored (recorded) in the 3D list is greater than or equal to 2 (i.e., a Yes result), it may mean that there are a plurality of source devices that can provide a 3D image. Accordingly, the current operation may advance to operation S711. If the number of source devices stored (recorded) in the 3D list is less than 2 (i.e., a No result), since it may mean that there is a single source device that can provide a 3D image, the current operation may advance to operation S713.

In operation S711, information of the source devices recorded in the 3D list may be processed through OSD and then displayed. The displayed information of the source devices may be either a title of the source device or information that can identify the HDMI port of the corresponding source device. The title of the source device may be displayed. A message that allows the user to select either the title of the source device or the information that can identify the HDMI port of the corresponding source device may be displayed together with the title of the source device. If the user selects in operation S712 one of the source devices of the 3D list displayed in the screen by using a directional key, touch, etc., the current operation may advance to operation S713.

The operation S713 may be performed when there is a single source device that can provide a 3D image, when there are a plurality of source devices that can provide a 3D image, or when one of a plurality of source devices is selected. In operation S713, when there is a single source device that can provide a 3D image, the 3D_Structure field within the Vendor Specific InfoFrame packet content of the source device may be analyzed and then the transport format of the 3D image of the source device may be identified or determined. A 3D image format of the source device may be set to the identified transport format (S714). In operation S713, when there are a plurality of source device that can provide a 3D image, the 3D_Structure field within the Vendor Specific InfoFrame packet content of one selected from the plurality of source devices may be analyzed in the transport format of the 3D image of the selected source device. A 3D image format of the selected source device may be set to the identified transport format (S714).

When there is a single source device that can provide a 3D image, the input mode may be switched to the corresponding source device, and when there are a plurality of source devices that can provide a 3D image, the input mode may be switched to the selected source device (S715). Subsequently, the play command may be transmitted to the source device of the switched input mode (S716). The play command may be transmitted using a CEC protocol. The source device that has received the play command may perform the play operation, and the 3D image played from the source device by the play operation may be transmitted to the receiving system 200. When the source device is a set top box that receives a 3D image from a broadcasting station and provides the received 3D image to the receiving system, the process of transmitting the play command may be skipped. The input mode may only be switched to the source device. That is, the operation S715 may be skipped. The 3D image processor 202 of the receiving system 200 may decode the 3D image transmitted from the source device in the transport format set in operation S714 and then display the decoded 3D image (S717).

Figure 8:
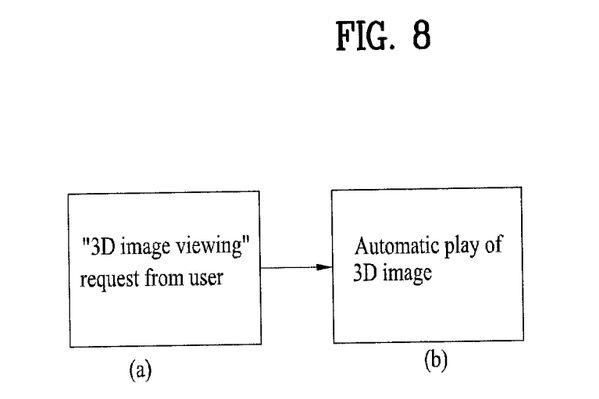
FIG. 8 to FIG. 10 are diagrams illustrating corresponding OSD screens for an example of a single source device that provides a 3D image, for an example of a plurality of source devices, and for an example of no source device.
Figure 9:
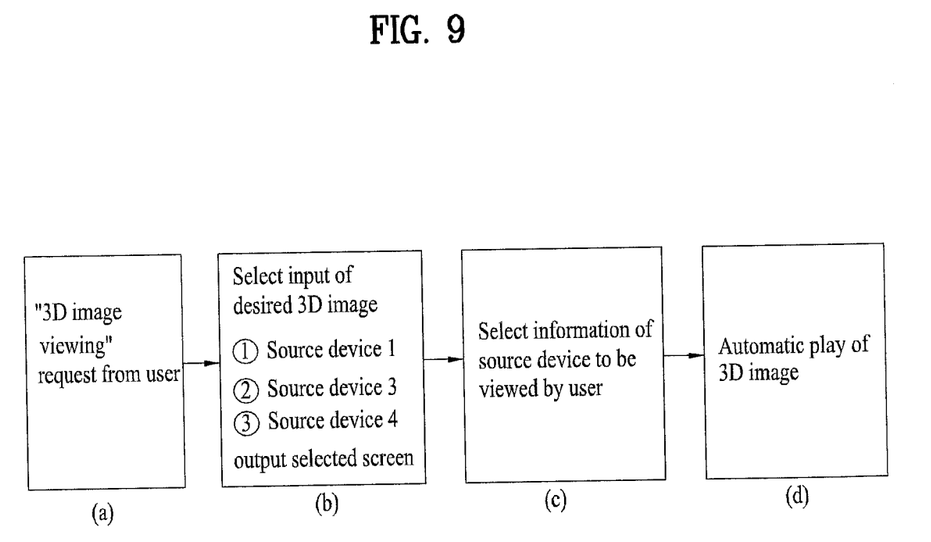
Figure 10:
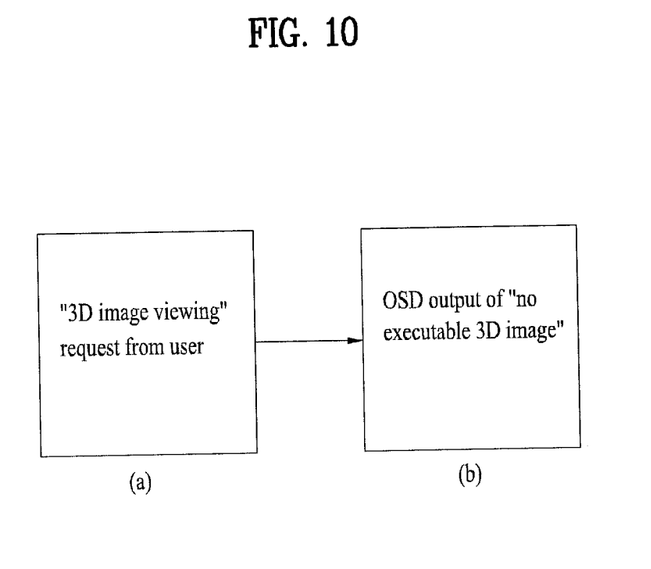

FIG. 8 to FIG. 10 are diagrams illustrating examples of corresponding OSD (or user interface (UI)) screens for an example of a single source device that provides a 3D image, for an example of a plurality of source devices, and for an example of no source device.

When the user requests '3D image viewing' as shown in (a) of FIG. 8, when there is a single source device that can provide a 3D image, the 3D image played from the corresponding source device may be automatically displayed as shown in (b) of FIG. 8.

When the user requests '3D image viewing' as shown in (a) of FIG. 9, when there are a plurality of source devices that can provide a 3D image, information of the plurality of source devices may be displayed on the screen in a list type as shown in (b) of FIG. 9 so as to allow the user to select one of the plurality of source devices. When one of the plurality of source devices is selected by the user as shown in (c) of FIG. 9, the 3D image played from the selected source device may be automatically displayed as shown in (d) of FIG. 9.

When the user requests '3D image viewing' as shown in (a) of FIG. 10, when there is no source device that can provide a 3D image, an error message such as "no executable 3D image" may be displayed as shown in (b) of FIG. 10.

A receiving system and a method of playing or providing a 3D image may have advantages. When the user desires to view the 3D image of the source device connected through the HDMI port, the user can directly view the 3D image through key input of the input device without any separate manipulation.

The user may not need to identify the HDMI ports that can provide a 3D image, one by one, and may also not need to search the transport format suitable for the 3D image of the source device. Accordingly, a manipulation time of the user may be saved, and simplicity may be maximized as even a beginner may easily view the 3D image using the '3D image viewing' request.

Embodiments of the present invention may be directed to a receiving system and a method of playing or providing a 3D image.

An embodiment may provide a receiving system and a method of playing or providing a 3D image in which a source device that provides a 3D image is searched in accordance with a request of a user, and the 3D image is received from the searched source device and then displayed.

An embodiment of the present invention may provide a receiving system and a method of playing or providing a 3D image in which a 3D image is received from a single source device in accordance with a selection of a user and then displayed when a plurality of source devices can provide a 3D image.

An embodiment may provide a receiving system and a method of playing or providing a 3D image in which a 3D image is received from a plurality of source devices and then displayed in accordance with a constant time interval when a plurality of source devices can provide a 3D image.

A method of playing or providing a 3D image of a receiving system may be provided by requesting 3D image viewing, searching for a source device that can provide a 3D image, and when there is a single source device that can provide a 3D image, switching an input mode (or input source) to the source device, transmitting a play command to the source device in accordance with a type of the source device and receiving the 3D image transmitted from the source device, and decoding and displaying the 3D image in accordance with a transport format of the received 3D image.

The source device may be connected with the receiving system through a digital interface.

Receiving the 3D image may include displaying information of a plurality of source devices when a plurality of source devices can provide a 3D image. If one of the displayed information of the plurality of source devices is selected by a user, switching the input mode (or input source) to the selected source device, and transmitting a play command to the selected source device in accordance with a type of the selected source device.

Receiving the 3D image may include transmitting the play command while switching the input mode (or input source) for the plurality of source devices at a constant time interval when there are a plurality of source devices that can provide a 3D image.

Displaying the 3D image may include decoding and displaying the 3D images of the plurality of source devices received at a constant time interval in accordance with corresponding transport formats.

A receiving system may include a 3D image processor and a display module. The 3D image processor may search a source device that can provide a 3D image, and when a 3D image viewing is requested, transmitting a play command to the source device in accordance with a type of the source device after switching an input mode (or input source) to the searched source device. The 3D image processor may receive the 3D image transmitted from the source device, and decode the 3D image in accordance with a transport format of the received 3D image. The display module may display the decoded 3D image.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing a three-dimensional (3D) image in a receiving system, the method comprising:
- receiving a request for a 3D image viewing;
- searching source devices that can provide 3D images in response to receiving the request for the 3D image viewing, each source device being coupled to the receiving system through a high definition multimedia interface (HDMI),
- wherein searching source devices includes:
  - receiving a Vendor Specific InfoFrame packet content from the specific source device; and
  - determining whether the specific source device can provide a 3D image based on a value of an HDMI Video Format field in the Vendor Specific InfoFrame packet content;
- displaying information of a plurality of source devices when there are the plurality of source devices that can provide 3D images;
- switching an input mode to a source device, which is selected by a user based on the displayed information, from among the plurality of source devices;
- identifying a transport format of a 3D image of the selected source device based on a value of a 3D Structure field in the Vendor Specific InfoFrame packet content received from the selected source device;
- receiving the 3D image from the selected source device;
- decoding the received 3D image in accordance with the identified transport format; and
- displaying the decoded 3D image at the receiving system.

2. The method of claim 1, further comprising transmitting a play command to the selected source device.

3. The method of claim 2, wherein the play command is transmitted through a consumer electronics control (CEC) line to the selected source device.

4. The method of claim 1, wherein receiving the 3D image includes:
- transmitting a play command while switching the input mode for a plurality of source devices at a constant time interval when the plurality of source devices can provide the 3D images.

5. The method of claim 1, wherein when no source device can provide a 3D image, the method further comprises displaying an error message of no executable 3D image.

6. A receiving system to provide a three dimensional (3D) image comprising:
- a display configured to display a content; and
- a 3D image processor configured to receive a request for a 3D image viewing, to search source devices that can provide 3D images by receiving a Vendor Specific InfoFrame packet content from each source device and determining whether the source device can provide a 3D image based on a value of an HDMI Video Format field in the Vendor Specific InfoFrame packet content to display information of a plurality of source devices when there are the plurality of source devices to switch an input mode to a source device, which is selected by a user based on the displayed information, from among the plurality of source devices, to identify a transport format of a 3D image of the selected source device based on a value of a 3D Structure field in the Vendor Specific InfoFrame packet content received from the selected source device, to receive the 3D image from the selected source device, and to decode the received 3D image in accordance with the identified transport format,
- wherein the display displays the decoded 3D image, and
- wherein each source device is coupled to the receiving system through a high definition multimedia interface (HDMI).

7. The receiving system of claim 6, wherein the 3D image processor transmits a play command to the selected source device.

8. The receiving system of claim 7, wherein the play command is transmitted through a consumer electronics control (CEC) line to the selected source device.

9. The receiving system of claim 6, wherein the 3D image processor transmits a play command while switching the input mode for the plurality of source devices at a constant time interval when the plurality of source devices can provide the 3D images.

10. The receiving system of claim 6, wherein the display displays an error message of no executable 3D image when no source device can provide a 3D image.

* * * * *